United States Patent [19]

Mathur et al.

[11] Patent Number: 4,927,509
[45] Date of Patent: May 22, 1990

[54] BIPOLAR ELECTROLYZER

[75] Inventors: Indresh Mathur, Sarnia; Allan James, Wallaceburg; David Bissett, Bright's Grove, all of Canada

[73] Assignee: H-D Tech Inc., Woodbridge, Canada

[21] Appl. No.: 870,474

[22] Filed: Jun. 4, 1986

[51] Int. Cl.$^5$ ............................................. C25B 1/30
[52] U.S. Cl. .................................. 204/83; 204/283; 204/294; 204/254; 204/268
[58] Field of Search ............... 204/84, 83, 254, 256, 204/268, 283, 294

[56] References Cited

U.S. PATENT DOCUMENTS

| | | | |
|---|---|---|---|
| 3,236,760 | 2/1966 | Messner | 204/256 |
| 3,462,351 | 8/1969 | Grangaard | 204/83 |
| 3,507,769 | 4/1970 | Grangaard | 204/265 |
| 3,592,749 | 7/1971 | Grangaard | 204/84 |
| 3,607,687 | 7/1967 | Grangaard | 204/84 |
| 3,968,273 | 7/1976 | Kastening et al. | 204/294 |
| 3,969,201 | 7/1976 | Olomon et al. | 204/84 |
| 4,069,129 | 1/1978 | Sato et al. | 204/279 |
| 4,142,949 | 3/1979 | Faul et al. | 204/279 |
| 4,313,813 | 2/1982 | Johnson et al. | 204/294 |
| 4,376,691 | 3/1983 | Lindstrom | 204/294 |
| 4,406,758 | 9/1983 | McIntyre et al. | 204/84 |
| 4,445,986 | 5/1984 | McIntyre et al. | 204/98 |
| 4,511,441 | 4/1985 | McIntyre et al. | 204/84 |
| 4,581,116 | 4/1986 | Plowman et al. | 204/284 |
| 4,584,080 | 4/1986 | Staab et al. | 204/255 |

FOREIGN PATENT DOCUMENTS 0088461 9/1983 European Pat. Off. .

Primary Examiner—John F. Niebling
Assistant Examiner—Kathryn Gorgos
Attorney, Agent, or Firm—Andrew E. Pierce

[57] ABSTRACT

A bipolar, filter press type cell is disclosed having a liquid permeable diaphragm which is particularly suited for the electrolysis of a brine solution to produce chlorine and caustic or the electrolysis of an aqueous alkali metal hydroxide to produce an aqueous alkaline hydrogen peroxide solution. The cell can include a multiplicity of cell units extending generally in a vertical as well as a horizontal direction. A porous, self-draining electrode assembly includes a current distributor in contact with a side of the electrode opposite the electrolyte active side of the electrode.

22 Claims, 2 Drawing Sheets

BIPOLAR ELECTROLYZER

BACKGROUND OF THE INVENTION

(1) Field of the Invention

This invention relates to bipolar, filter press type electrochemical cells having porous, self-draining electrodes and liquid permeable diaphragms.

(2) Description of the Prior Art

Packed bed chlor-alkali electrolytic cells are known from Oloman et al U.S. Pat. No. 3,969,201 and U.S. Pat. No. 4,118,305. Improvements in these cells have been disclosed by McIntyre et al in U.S. Pat. No. 4,406,758; U.S. Pat. No. 4,431,494; U.S. Pat. No. 4,445,986; U.S. Pat. No. 4,511,441; and U.S. Pat. No. 4,457,953. These packed bed electrolytic cells are particularly useful for the production of alkaline solutions of hydrogen peroxide.

Among known bleaching agents, hydrogen peroxide is at the present time being increasingly used, in particular for bleaching materials such as textiles or paper pulp. Hydrogen peroxide has the great advantage over other bleaching agents, in particular chlorine and its compounds, in that because of its mild action, it attacks the fibers of the material to be treated to a much lesser extent and gives a better finish.

Hydrogen peroxide is generally used in bleaching in the form of a stabilized alkaline solution of low peroxide concentration. The action of hydrogen peroxide in bleaching consists essentially of destroying or decolourising the natural dyes by oxidation, or by rendering them soluble. Even though the mechanism of these reactions has been little studied, it is generally assumed that the hydrogen peroxide ion $HOO^-$ is responsible for the bleaching.

Present-day bleaching solutions based on hydrogen peroxide have the great disadvantage with respect to other conventional bleaching solutions (in particular hydrochlorite-based solutions) of being relatively costly Their widespread use is very dependent upon economic considerations, particularly when large quantities of low-value material such as paper pulp are to be treated Present-day bleaching solutions are nearly always prepared by simple dissolving and dilution, starting from commercially available chemicals. Commercially available hydrogen peroxide is a particularly costly substance, as it is manufactured only in a small number of large industrial plants, and it has therefore to be highly concentrated for storage and transport purposes before being distributed. At the present time there is a need to replace the highly concentrated, commercially available hydrogen peroxide by on site manufacturing methods which enable dilute solutions of hydrogen peroxide to be produced directly, in order to reduce bleaching costs. However, up to the present time no satisfactory method has appeared.

Hydrogen peroxide is used not only for bleaching purposes, but also in an increasing number of other processes, in particular in the pollution control field. However, treatment solutions used for this purpose are likewise almost always prepared from highly concentrated hydrogen peroxide with the same disadvantages as heretofore stated.

In Grangaard, U.S. Pat. No. 3,607,687; U.S. Pat. No. 3,462,351; U.S. Pat. No. 3,507,769; and U.S. Pat. No. 3,592,749 there are disclosed electrolytic cells for the production of hydrogen peroxide in which the peroxide is produced in the cathode compartment of the cell which contains a cathode depolarized utilizing an oxygen containing gas. The electrochemical cells of Oloman et al and McIntyre et al disclosed in the patents cited above, are improvements over the cells of Grangaard partly as the result of the use of the novel electrode material disclosed in U.S. Pat. No. 4,457,953 in which there is disclosed a method for the production of coated particles for use in a packed bed electrode electrochemical cell.

It has been found that a packed bed, self-draining cathode for maximum productivity within an electrochemical cell for the production of an alkaline hydrogen peroxide solution must be supplied with a liquid anolyte through an electrolyte porous diaphragm at a substantially uniform rate of flow across the porous diaphragm without appreciable variation of the flow rate as a function of the head of the electrolyte. Prior art porous diaphragms for packed bed electrolytic cells have permitted a considerable variation in flow rate with the flow rate at the base of the cell (exposed to the full head of the electrolyte) being appreciably faster than the flow rate in the center of the cell or at the top of the cell, where a decreased head pressure is exerted on the diaphragm. This variation in flow rate has resulted in inefficiency of the cell. Where an attempt has been made to reduce the flow rate through the cell diaphragm, it has been found that too little electrolyte passes through the porous diaphragm into the cathode where the diaphragm is exposed to a minimal head of electrolyte. A reduced amount of electrolyte passing through the porous diaphragm into the cathode also results in an increase in cell voltage. An excessive amount of electrolyte passing through the porous diaphragm causes flooding of the packed bed cathode and consequent reduction in the depolarizing effect of the oxygen containing gas fed to the side of the packed bed cathode opposite to that which is exposed to the electrolyte.

SUMMARY OF THE INVENTION

A bipolar electrochemical cell is disclosed having a porous, self-draining, gas diffusion electrode arranged in a filter press type configuration. A more uniform rate of electrolyte flow into the porous, self-draining electrode is obtained by utilizing a multiplicity of cell units stacked vertically as well as horizontally. The height of each cell unit can be minimized making more uniform the rate of electrolyte flow, from top to bottom, across a liquid permeable diaphragm and into the porous, self-draining electrode. The substantially uniform electrolyte flow that is essential to the efficient operation of a porous, self-draining, gas diffusion electrode is therefore assured simply by controlling the height of the individual cell units of the bipolar electrolyzer of the invention.

A bipolar electrochemical cell is also disclosed comprising a porous, self-draining, gas diffusion electrode and current distributor assembly, including a liquid permeable diaphragm, wherein the current distributor is integral with an electrode opposite in polarity to said current distributor. The current distributor is in contact with a face of said electrode which is arranged during operation of said cell in a generally vertical direction, and in contact with a gas diffusion face of said electrode on a face opposite to the face forming the electrolyte active side of the electrode. Thus anode/current distributor or cathode/current distributor bipolar electrodes are disclosed. The cell diaphragm is in contact with or supports the electrode. Better flow of electrolyte through the self-draining electrode is obtained, with an unexpectedly low voltage penalty, by contact of the current distributor with said electrode on the gas diffusion face thereof.

DETAILED DESCRIPTION OF THE INVENTION AND THE PREFERRED EMBODIMENTS

Figure 1:
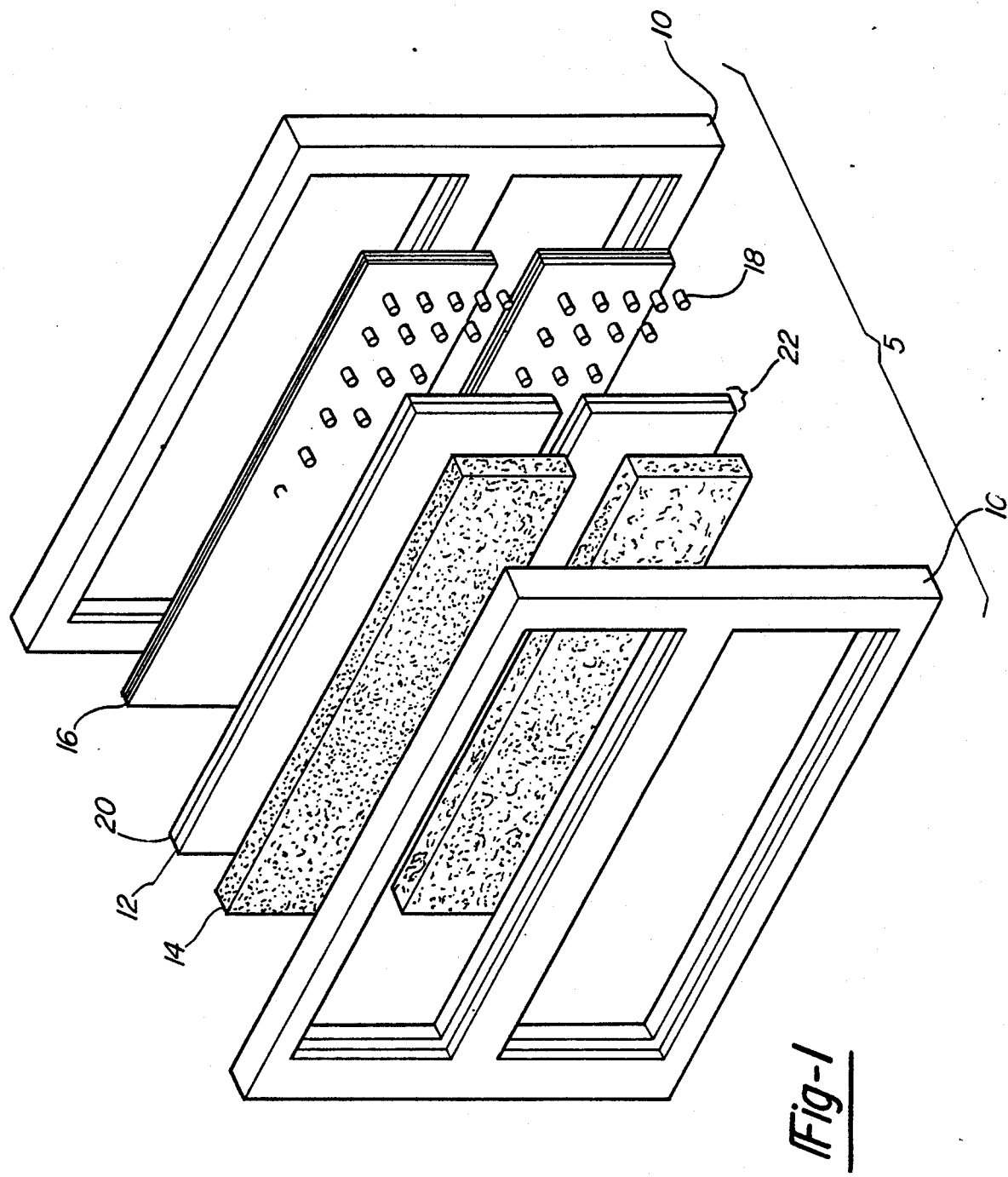
FIG. 1 is an exploded view of a schematic representation of one embodiment of the bipolar electrochemical cell of the invention wherein a frame component is shown having two openings adapted for placement of the remaining components of the cell.

In one embodiment of the invention illustrated in FIG. 1, there is shown schematically a unit of a bipolar electrolyzer 5 according to the invention. Each unit contains frame portions 10, a multiple layered liquid permeable diaphragm 16, a non-conductive spacing means 18, an anode portion 20 of a bipolar electrode 22, a current distributor portion 12 of a bipolar electrode 22, and a porous, self-draining cathode 14. The electrical connections for the cell electrodes and the means for distribution of electrolyte and removal of products of electrolysis are not shown.

Figure 2:
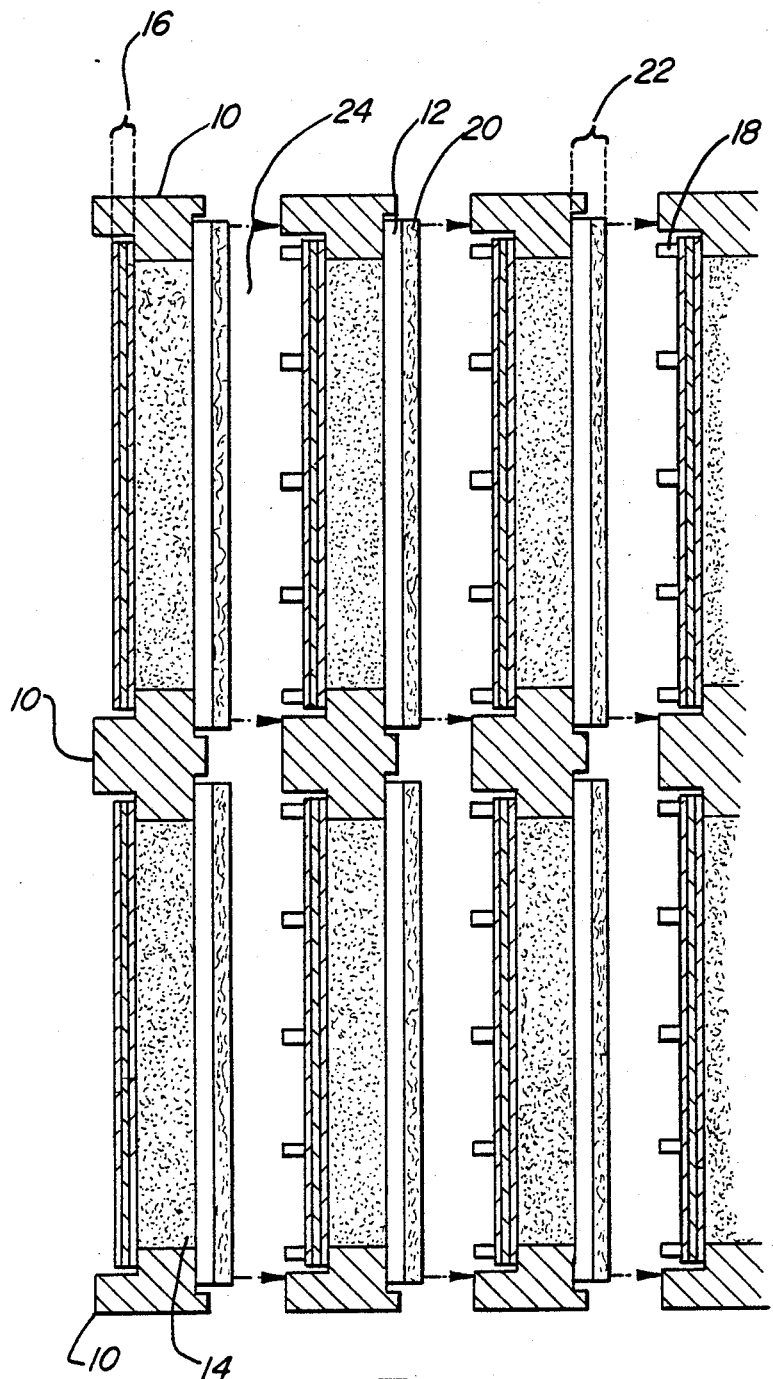
FIG. 2 is a schematic representation of a cross sectional side view of one embodiment of the bipolar electrochemical cell of the invention in which the frame component has two openings adapted for placement of the remaining components of the cell.

In FIG. 2, there is shown schematically and partially exploded, a side sectional view of an embodiment of the bipolar electrolyzer of the invention corresponding to the embodiment shown in FIG. 1. Corresponding cell components are similarly numbered. The same elements are numbered similarly as in FIG. 1. The bipolar cell of the invention is shown in the FIGS. as having a frame 10 which can accommodate two electrolytic cells stacked vertically. It will be understood by those skilled in the art that additional cell units can be stacked vertically simply by utilizing a frame having the required number of openings suitable for holding the cell components. Alternatively, the bipolar cell of the invention can be used in a stacked arrangement of single cell units having individual rather than multiple cell units.

In operation, anolyte passes by gravity feed from the anolyte compartment 24 of the cell through the liquid permeable diaphragm to the self-draining cathode. The liquid electrolyte flow across the diaphragm is relatively uniform as the result of the use of multiple layers of the liquid permeable diaphragm material as well as the design of the cell so as to restrict the height of each individual cell unit to less than about 2 feet, preferably about 1 foot. The porous, self-draining cathode 14 is electrically conductive and is in contact with and supported by the liquid permeable diaphragm 16. The opposite side of said cathode is in contact with a current distributor portion 12 of a bipolar electrode 22. During operation of the bipolar cell a gas is fed to the non-electrolyte active portion of the self-draining cathode 14 and an aqueous product is removed from the self-draining electrode 14. The anode portion 20 of the bipolar electrode is separated from the diaphragm 16 by spacing means 18 forming an anolyte compartment 24.

This invention relates in one embodiment of the invention to an improved bipolar electrolyzer comprising at least one porous, self-draining electrode, a bipolar anode/current distributor, a liquid permeable diaphragm, a spacing means forming an anode compartment between the diaphragm and the anode portion of the bipolar anode/current distributor, and a frame component which is suitable when used in multiples for the placement of multiple bipolar electrolytic cell units in a vertical and horizontal direction. This design minimizes the unevenness of electrolyte flow within each cell unit from top to bottom across a liquid permeable diaphragm into a porous, self-draining electrode. By limiting the height of the individual bipolar cell units, uneven current distribution caused by unevenness of electrolyte flow is minimized. It is thus possible to operate the cell at increased efficiency and to extend the life of the electrode as the result of increasing the flow of electrolyte into the self-draining electrode at the upper portion thereof and reducing the flooding of the electrode at the lower portion thereof.

There are several problems relating to the use of porous, self-draining electrodes that tend to prevent their exploitation in commercial processes. One of these problems is the difficulty of providing a substantially uniform flow of electrolyte from one cell compartment through the electrolyte permeable cell diaphragm to the porous, self-draining electrode over the entire range of practical electrolyte head levels. In electrolytic cells for the production of an alkaline hydrogen peroxide solution, said cells having packed bed, self-draining cathodes operating at atmospheric pressure and an anolyte head of from 1 to 6 feet or more, the unevenness of flow of anolyte through the electrolyte permeable cell diaphragm to the cathode is readily apparent. At the lower portion of the face of a vertically positioned, self-draining cathode, which is exposed to the full height of the anolyte, flooding of a portion of fixed bed, porous, self-draining cathode can occur resulting in inactivation of the flooded portion of the electrode. At the same time, at the upper portion of the cathode, which is exposed to only a small fraction of the anolyte liquid head, the cathode is subjected to an insufficient flow of anolyte and therefore there results insufficient wetting of the cathode which causes an increase in cell voltage.

In order to avoid flooding of such a packed bed, gas diffusion cathode, the prior art has suggested the use of special waterproofed cathodes and/or attempted to balance the anolyte pressure with the gas pressure across the packed bed cathode. One method of controlling the flow through the cell diaphragm is to operate the anolyte compartment under either gas or liquid pressure. In this method the anolyte chamber of the electrolytic cell is sealed from the atmosphere and gas pressure or liquid pressure is exerted upon the electrolyte. High pressure pumps can be used to force a pressurized liquid electrolyte into the opposing catholyte compartment or a pressurized gas can be fed to the anolyte compartment. Alternatively, the pressure drop across the cell diaphragm can be regulated by pulling a vacuum on the cathode side of the cell diaphragm. This will pull the electrolyte toward and through the diaphragm and finally into the self-draining cathode. These methods have not proven commercially acceptable and have led to further research effort, the results of which form the basis of this invention.

An electrolytic cell utilizing at least one packed bed, self-draining, gas diffusion electrode can be used in the production of chlorine and alkali metal hydroxide but is particularly useful in the production of hydrogen peroxide. Where a packed bed, self-draining, gas diffusion cathode is utilized for the electrolysis of, for example, sodium chloride, chlorine is produced in the anolyte compartment of the cell and aqueous sodium hydroxide is produced in the catholyte compartment of the cell. Hydrogen, which would normally be produced at the cathode is not produced when an oxygen containing depolarizing gas is fed to a gas diffusion cathode, thus effecting a saving in cell voltage. In the prior art, one type of cathode developed for utilization of oxygen as a depolarizing gas is characterized by a structure composed of a thin sandwich of a microporous layer of plastic film combined with a catalyzed layer which is wetproofed with a fluorocarbon polymer. Such gas depolarized cathodes generally are in contact, on the electrolyte active face of said cathode, with a wire screen termed a "current collector" in a fuel cell, or a "current distributor" in an electrolytic cell. Current is thereby distributed to the catalyzed layer of the electrode in an electrolytic cell and an oxygen containing gas can be fed into the catalyzed layer of the cathode through a microporous backing layer on said cathode. Such cathodes have suffered from various deficiencies including delamination of the various layers during operation in the cell and the ultimate flooding by electrolyte of the catalyzed layer leading to inactivation of the cathode and shut down of the cell. The self-draining electrodes described above are an improved form of gas depolarized cathode for use in the production of an alkaline hydrogen peroxide solution or a halogen such as chlorine and an alkali metal hydroxide solution.

Electrolytic cells for the reduction of oxygen to peroxide have also been described in the prior art as utilizing one side of a porous carbon plate in contact with the electrolyte and an oxygen containing gas delivered to the opposite side of the plate for reaction within the plate. These porous gas diffusion electrodes require careful balancing of oxygen and electrolyte pressure to keep the reaction zone confined evenly just below or on the surface of the porous plate. The packed bed, self-draining cathode described in U.S. Pat. No. 4,118,305 is an improved form of electrode as compared to the above porous carbon plate.

In one embodiment of the electrochemical cell of the invention, an electrolyte permeable diaphragm is used which is composed of one or more layers of a liquid permeable material. In addition, the cell design provides for the control over the height of the individual units of the bipolar electrolytic cell by the use of frame components which can accommodate multiple cells stacked vertically forming an integral unit as well as in the usual horizontal direction characteristic of filter press type bipolar electrochemical cells. Alternatively, individual cell units can be stacked vertically to accomplish similar objectives. In the production of chlorine and caustic or in the production of an alkaline aqueous solution of hydrogen peroxide by electrolysis, a porous, self-draining cathode is supplied with an oxygen containing gas on the side of the cathode which is inactive with respect to reaction with electrolyte. Generally, the liquid permeable porous diaphragm can be composed of any porous material. Preferably the diaphragm for use in the production of alkaline hydrogen peroxide is composed of multiple layers of (1) a microporous polyolefin film alone or (2) in combination with a supporting fabric resistant to degradation upon exposure to electrolyte.

In the following description, an electrochemical reaction for the production of an alkaline hydrogen peroxide solution is described as a representative electrochemical process utilizing the bipolar electrolyzer of the invention. The process is conducted by electrolyzing an aqueous solution comprising an alkali metal hydroxide as electrolyte. The electrolytic cell is divided by a liquid permeable diaphragm into catholyte and anolyte compartments containing, respectively, a cathode and an anode. An aqueous solution of hydrogen peroxide and an alkali metal hydroxide is recovered as the product of hydrolysis from the catholyte compartment. An oxygen containing gas, such as air, is simultaneously flowed into at least a portion of the porous, self-draining electrode which acts as a cathode. Electrolyte is simultaneously controllably flowed from the anolyte compartment of the cell into the self-draining cathode of the cell through a multiple layered liquid electrolyte permeable diaphragm at a flow rate about equal to the drainage rate of said cathode. The flow rate through said diaphragm is determined by the differential pressure on said diaphragm. On the cathode side of the diaphragm, the pressure may be at atmospheric pressure or above as the result of flowing gas under pressure into a cathode bed which can comprise a packed bed of loose particles. The pressure on the anode side of said diaphragm can be adjusted by changing the head of electrolyte in the anolyte compartment. The head of anolyte is specified in this specification and claims as the total head, as measured from the bottom of the diaphragm to the top surface of the anolyte liquid. Thus the effective pressure which causes the flow of anolyte through the cell diaphragm is the head pressure of the anolyte minus the pressure exerted on the catholyte side of said diaphragm by the gas which is fed into the cathode of the cell.

The porous, self-draining cathode generally has a thickness of about 0.1 to about 2.0 centimeters in the direction of current flow. The cathode can comprise a fixed bed (sintered) porous matrix as well as a bed of loose particles, said electrode having pores of sufficient size and number to allow both gas and liquid to flow therethrough. The cathode generally contains a conductive material which may also be a good electrocatalyst for the reaction to be carried out. In the reduction of oxygen to hydrogen peroxide, graphite particles coated with carbon and polytetrafluoroethylene as a binder have been found to be suitable for forming the cathode mass because the graphite substrate is cheap, conductive, and requires no special treatment. For other reactions, uncoated graphite or other forms of carbon or tungsten carbide substrates can be used as well as certain metals such as platinum, iridium, or metal oxides such as lead dioxide or manganese dioxide coated on a conducting or nonconducting substrate. The graphite particles typically have diameters in the range of about 0.005 to about 0.5 centimeters and have a minimum diameter of about 30 to about 50 microns. It is the bed of particles which acts as the cathode.

Generally, the self-draining cathode is supplied with current through a cathode contacting current distributor which can be a metal mesh or metal sheet, generally made of any electrically conductive metal, but preferably nickel. The current distributor contacts the cathode on the largest face which is opposite to the face which is in contact with the diaphragm. The cathode is also supplied with an oxygen containing gas so as to depolarize the cathode during operation of the cell and to prevent the formation of hydrogen at the cathode during the electrolysis. It was found that there is considerably less voltage penalty in placing the current distributor in this location than was expected By placing the current distributor on the back face of the porous, self-draining cathode, improved flow into the cathode is obtained The wicking tendency, shown when the current distributor is on the electrolyte active face of the cathode, is avoided and better electrolyte flow into the cathode is obtained, thus increasing gas liquid contact.

In the bipolar electrochemical cell of the invention, each individual cell unit contains a porous liquid permeable diaphragm separating an anolyte compartment and a catholyte compartment which contain respectively an anode and a cathode of the cell unit. Generally, the cell diaphragm is positioned so as to support the electrolyte active face of the porous, self-draining cathode. The cell diaphragm can also be indirectly as well as directly supported on one side by the self-draining cathode. The cell diaphragm preferably comprises an assembly having multiple layers of a microporous polyolefin film diaphragm material or a composite comprising an electrolyte resistant support fabric and said microporous polyolefin film. The support fabric can be laminated to said film and can be a woven or non-woven fabric selected from the group consisting of asbestos, polyolefins, polyamides, polyesters and mixtures thereof Preferably said support fabric is a woven or non-woven polyolefin selected from the group consisting of polyethylene, polypropylene, polytetrafluoroethylene, fluorinated ethylene propylene, polychlorotrifluoroethylene, polyvinyl fluoride, polyvinylidene fluoride, and mixtures thereof. No necessity exists for holding together the multiple layers of the diaphragm. At the peripheral portions thereof, as is conventional, or otherwise, the diaphragm is adhered to the frame members of the electrolytic cell. Multiple diaphragm layers of two to five layers of film or composite have been found useful in reducing the variation in flow of electrolyte through the cell diaphragm over the usual and practical range of electrolyte head. A one layer diaphragm may be suitable under certain conditions. Portions of the multiple layered diaphragm which are exposed to the full head of electrolyte, as compared with portions of the cell diaphragm which are exposed to little or no electrolyte head, pass substantially the same amount of electrolyte to the cathode.

As an alternative means of producing a useful multiple layer diaphragm, it has been found desirable to prepare a cell diaphragm having variable layers of the defined porous film or composite diaphragm material. Thus it is suitable to utilize one to two layers of the defined porous film or composite material in areas of the cell diaphragm which are exposed to relatively low pressure as the result of being positioned close to the top surface of the body of electrolyte while utilizing two to six layers of the defined film or composite porous material in areas of the diaphragm exposed to moderate or high pressure of the electrolyte. A preferred construction is two layers of the defined film or composite porous material on the top portion of the diaphragm and three layers of said composite on the bottom portion of said diaphragm.

For use in the preparation of an alkaline aqueous solution of hydrogen peroxide, a polypropylene woven or non-woven fabric support layer is preferred for use in the formation of the composite diaphragm of the invention. Alternatively, there can be used any other polyolefin, polyfluorinated hydrocarbon, polyamide, or polyester fabric or mixtures thereof and each of these materials can be used in combination with asbestos in the preparation of the supporting fabric. Representative support fabrics include fabrics composed of polyethylene, polypropylene, polytetrafluoroethylene, fluorinated ethylenepropylene, polychlorotrifluoroethylene, polyvinyl fluoride, asbestos, and polyvinylidene fluoride. A polypropylene fabric resists attack both by strong acids and bases and is cost effective.

The film or composite diaphragm is characterized as hydrophilic, having been treated with a wetting agent in the preparation thereof. In a 1 mil thickness, the film portion of the composite has a porosity of about 38% to about 45%, and an effective pore size of 0.02 to 0.04 micrometers. A typical composite diaphragm consists of a 1 mil thick microporous polyolefin film laminated to a non-woven polypropylene fabric with a total thickness of 5 mils. Such porous material composites are available under the trade designation CELGARD® from Celanese Corporation. Utilizing multiple layers of the above described porous composite material as an electrolytic cell diaphragm, it is possible to obtain a flow rate within an electrolytic cell of about 0.01 to about 0.50 milliliters per minute per square inch of diaphragm, generally over a range of electrolyte head of 0.5 foot to 4 feet, preferably 1 to 2 feet. Preferably said flow rate over said range of electrolyte head, is about 0.03 to about 0.3 and most preferable is about 0.05 to about 0.1 milliliters per minute per square inch of diaphragm. Cells operating at above atmospheric pressure on the cathode side of the diaphragm would have reduced flow rates at the same anolyte head levels since it is the differential pressure that is responsible for electrolyte flow across the diaphragm.

Prior art patents U.S. Pat. No. 4,118,305; U.S. Pat. No. 3,969,201; U.S. 4,445,986; and U.S. Pat. No. 4,457,953 are hereby incorporated by reference. Self-draining, packed bed electrodes disclosed in these patents are typically composed of graphite particles, however other forms of carbon can be used as well as certain metals. The packed bed cathode typically has a plurality of interconnecting passageways having average diameters sufficiently large so as to make the cathodes self-draining, that is, the effects of gravity are greater than the effects of capillary pressure on an electrolyte present within the passageways. The diameter actually required depends upon the surface tension, the viscosity, and other physical characteristics of the electrolyte present within the packed bed electrode. Generally the passageways have a minimum diameter of about 30 to about 50 microns, but the maximum diameter is not critical. The self-draining cathode should not be so thick as to unduly increase the resistance losses of the cell. A suitable thickness for a packed bed cathode has been found to be about 0.03 inch to about 1 inch, preferably about 0.06 inch to about 0.5 inch. Generally the packed bed cathode is electrically conductive and prepared from such materials as graphite, steel, iron, and nickel Glass, various plastics, and various ceramics can be used in admixture with conductive materials. The individual particles can be supported by a non-electrically conductive screen or other suitable support or the particles can be sintered or otherwise bonded together but none of these alternatives is necessary for the satisfactory operation of a useful packed bed cathode.

An improved material useful in the formation of the packed bed cathode is disclosed in U.S. Pat. No.

4,457,953 comprising a particulate substrate which is at least partially coated with an admixture of a binder and an electrochemically active, electrically conductive catalyst. Typically the substrate is formed of an electrically conductive or nonconductive material having a particle size smaller than about 0.3 millimeters to 2.5 centimeters or more. The substrate need not be inert to the electrolyte or to the products of the electrolysis of the process in which the particle is used but is preferably chemically inert since the coating which is applied to the particle substrate need not totally cover the substrate particles for the purposes of rendering the particle useful as a component of a packed bed cathode. Typically the coating on the particle substrate is a mixture of a binder and an electrochemically active, electrically conductive catalyst. Various examples of binder and catalyst are also disclosed in U.S. Pat. No. 4,457,953.

Stablizing agents suitable for addition to the electrolyte of an electrolytic cell for the production of hydrogen peroxide are disclosed in U.S. Pat. No. 4,431,494, incorporated herein by reference. Such stablizing agents include compounds that form chelates with impurities found to be catalysts for the decomposition of the hydrogen peroxide produced within the cell. Specific stabilizing agents include alkali metal salts of ethylene-diaminetetraacetic acid, stannates, phosphates, alkali metal silicates, and 8-hydroxyquinoline.

In an electrolytic cell where aqueous sodium or potassium hydroxide is desired as a product, generally a brine is fed to the anolyte compartment of the electrolytic cell so as to maintain a pH of about 1.5 to about 5.5. Typically the sodium or potassium chloride is fed at a saturated or substantially saturated concentration containing from about 300 to about 325 grams per liter of sodium chloride or from about 450 to about 500 grams per liter of potassium chloride. The catholyte liquor recovered from the electrolytic cell can contain approximately 10 to 12 weight percent sodium hydroxide and 15 to 25 weight percent sodium chloride or approximately 15 to 20 weight percent potassium hydroxide and approximately 20 to 30 weight percent potassium chloride.

In an electrolytic cell for the production of hydrogen peroxide, typically the anolyte liquor is an aqueous solution containing about 15 to about 100 grams per liter of alkali metal ion, i.e. sodium ion. The catholyte liquor recovered from the electrolytic cell can contain approximately 0.5 to 8 weight percent hydrogen peroxide and 15 to 200 grams, per liter sodium hydroxide The standard anode material for commercial water electrolyzers has been nickel or stainless steel because of good chemical stability in the normally employed alkaline electrolyte which can have a concentration of alkali metal hydroxide of between 15 and 30% by weight. Over the service life of the nickel electrode, the over-voltage for oxygen evolution increases causing a reduction in efficiency, as indicated by low levels of operational current density. In recent years, increasing attention has been directed toward improving the oxygen over-voltage characteristics of electrolytic cell anodes, particularly those anodes utilized in the electrolysis of water or in the production of hydrogen peroxide where a strongly alkaline anolyte is utilized, for instance, a of an alkali metal halide and an alkali metal hydroxide. Electrolytic cells for the production of an alkaline hydrogen peroxide have at least two electrodes, an anode and a cathode, separated by a liquid permeable diaphragm. Preferably the cathode is in physical contact with the diaphragm and is porous and self-draining. In addition to exhibiting a reduced oxygen over-voltage, an anode for such purposes should also be constructed from materials which are inexpensive, easy to fabricate, mechanically strong, and capable of withstanding the environmental conditions of the electrolytic cell, and particularly capable of resisting dissolution in the alkaline anolyte.

The problem of increased over-potential with increasing service of nickel anodes under alkaline conditions has been lessened by the recent adoption of prior art coatings on electroconductive substrates of noble metals of Group VIII of the Periodic Table of the Elements. However, use of expensive metal coatings such as ruthenium oxide in the production of anodes for oxygen evolution has met with the problem of dissolution of the electrode coating in an alkaline electrolyte. Those metals, which, when coated on electroconductive substrates, do not dissolve in strongly alkaline anolytes during oxygen evolution, will generally be covered with an oxide film and suffer a loss of activity with increasing service. Electrodes having deposited thereon electrode catalysts such as the mixed nickel-molybdenum type of the prior art which subsequent to deposition from a homogeneous solution of their compounds are decomposed to their oxides by heating and thereafter exposed to a reducing atmosphere at elevated temperature, show a marked over-voltage improvement over those disclosed heretofore. Useful electroconductive substrates for use with such electrode catalyst coatings have also been disclosed in the prior art as relatively inexpensive materials such as nickel, iron, copper, titanium, and alloys thereof or of other metallic substances coated with any of these materials.

The anode of the electrochemical cell of the invention can be a dimensionally stable anode such as those conventionally used in electrolytic cells for the production of chlorine and caustic. In an electrolytic cell for the production of hydrogen peroxide, the anode can be stainless steel but is preferably an insoluble electrode prepared by coating an electrically conductive substrate such as nickel or a nickel plated substrate with an effective electrocatalytic amount of cobalt and tungsten compounds, such as the nitrates and chlorides. The coating can be applied to the electrically conductive substrate from a homogeneous solution of a mixture of compounds of cobalt and tungsten wherein said compounds are capable of thermodecomposition to their oxides subsequent to application of the coating to the substrate. Such compounds can be, for instance, the nitrates or chlorides of cobalt and tungsten. The weight ratio of cobalt to tungsten in the compounds utilized in the preparation of the anodes of the invention is respectively about 1:1 to about 5:1. The electrodes thus prepared, are stable to dissolution in strongly alkaline anolytes, as are encountered in processes for the preparation of an alkaline solution of hydrogen peroxide, and exhibit low over-voltage initially and after long periods of service.

The homogeneous solution of the cobalt and tungsten compounds utilized for coating the electroconductive substrates in the formation of these anodes is defined as an intimate mixture of the respective solid metal compounds in their finely divided state, or a solid solution of the metal compounds, or a solution of the compounds in a solvent. An intimate mixture of the solid metal compounds can be prepared in advance or the compounds can be mixed immediately prior to contact with the electroconductive substrate to be coated. For instance, the compounds of cobalt and tungsten can be applied onto the electroconductive substrate either separately or simultaneously. The compounds of cobalt and tungsten can be sprayed directly onto the electroconductive substrate. Alternatively, the cobalt and tungsten compounds can be present in a homogeneous solution in a solvent for the compounds. The solvent can be an aqueous solution or a mixture of an aqueous and organic solvent or an organic solvent solution of the compounds, for example, a lower alkyl compound such as methanol, ethanol, propanol, isopropanol or formamide or dimethyl formamide. The choice of a particular solvent will depend upon the solubility of the desired compounds of cobalt and tungsten.

If the homogeneous solution is a liquid, it can be applied to the electroconductive substrate to be coated by dipping, rolling, spraying, or brushing. The coated electroconductive substrate is thereafter heated in air at an elevated temperature to decompose the metal compounds, if not oxides, to the corresponding oxides. The decomposition is suitably carried out at a temperature between 250° centigrade and 1200° centigrade, preferably between 350° centigrade and 800° centigrade, most preferably between about 350° to about 550° centigrade. The operation of applying a coating of the homogeneous solution to the electroconductive substrate followed by thermodecomposition to the oxides can be repeated successively to ensure adequate coverage of the substrate with the metal oxides so as to provide a coating thickness of about 2 to about 200 microns. Coating thicknesses of from about 10 to about 50 microns are preferred while coatings of less than about 10 microns in thickness usually do not have acceptable durability and coatings of more than 50 microns usually do not produce any additional operating advantages.

Although the concentrations and relative proportions of the cobalt and tungsten compounds with respect to the solvent used in the homogeneous solution are not critical, particularly good coatings are produced when the concentration of the cobalt ions in the bath is within the range of about 0.5% to about 5% by weight and when the relative proportion of tungsten ions to cobalt ions in the bath is maintained at about 0.5:1.

The deposit of the homogeneous solution of cobalt and tungsten compounds or their oxides may be obtained by use of a sequential application of a mixture, an alloy, or an intermetallic compound, depending upon the particular conditions utilized in preparing the deposit. Since any of these particular combinations of metal are within the scope of the present invention, the term "codeposit", or form thereof, as used in the present specification and claims, includes any of the various alloys, compounds and intermetallic phases of the cobalt and tungsten compounds or oxides of said compounds and does not imply any particular method of application or process of formulation with respect to these metal compounds used as electrocatalysts. While the electroconductive substrates to be coated preferably are of nickel and nickel coated steel, other electrically conductive metal substrates can be used if coated with nickel.

The cobalt compounds used in making the homogeneous solution with tungsten compounds can be any thermally decomposable oxidizable compound which when heated in the prescribed heating range will form an oxide of cobalt. The compound can be organic such as cobalt octoate (cobalt 2-ethyl hexanoate) but is preferably an inorganic compound such as cobalt nitrate, cobalt chloride, cobalt hydroxide, cobalt carbonate, and the like. Cobalt nitrate and cobalt chloride are especially preferred.

The tungsten compounds used in making the electrodes of the present invention can be any thermally decomposable oxidizable compound which when heated in the prescribed heating range will form an oxide of tungsten. The compound can be organic such as tungsten octoate and the like but is preferably an inorganic compound such as tungsten nitrate, tungsten chloride, tungsten hydroxide, tungsten carbonate, and the like. Tungsten nitrate or tungsten chloride are especially preferred.

The frame component of the bipolar cell of the invention can be of metal or plastic construction Prior art cell frame construction has used heavy member construction and/or cylindrical shaped members. Heavy walled construction either with solid, electrolyte resistant metals such as titanium and nickel or steel lined with an electrolyte resistant metal is expensive and consumes large amounts of metal. For these reasons chlor-alkali cells of the filter press type have not been extensively utilized Generally, filter press type chlor-alkali cells are constructed so that the porous, liquid permeable diaphragms are clamped under pressure between flanges of the filter press frames.

Early filter press type cells were constructed of heavy plastic frames. Generally these cells were of the bipolar type which utilized a solid sheet or back plate which functioned as a divider between the cells and was fabricated integrally with the frame. Bipolar cells of this type followed the well developed filter press fabrication principles. The integral frame-back plate construction provided excellent stiffening of the frame structure. The frames for these cells were molded from hard rubber, filled polypropylene, polyester-fiberglass, polyester or any other material that was chemically resistant to the cell environment. Generally, the anode frame was formed of these plastic materials while the cathode frame was formed from steel.

The size of filter press type cells having plastic frames tends to be limited by the high cost for very large molds and the tendency for warping that tends to occur in heavy plastic frames when the frames are subjected to operating temperatures during actual cell use. The plastic parts employed in these cells tend to have a high coefficient of expansion compared to the electrodes and other metal parts of the cells. Distortion is caused within the cell when the various parts expand or contract at different rates. Filled plastic frames are susceptible to corrosion by chlorine especially when the filler material is a material such as calcium carbonate.

Therefore, because of such deficiencies, present day filter press electrolytic cells generally employ metal frames. Metal frame construction provides advantages in high strength, small cross sectional area in the structural members, corrosion resistance, resistance to warping and compatibility with respect to coefficient of expansion with metal electrode surfaces. The very high fabrication cost of metal frames has led to attempts to reduce the cost such as by the employment of plastic frames which will give the advantages that metal frames offer without the high cost.

The frame component of the bipolar cell of the invention can be composed of solid, as opposed to hollow or U or channel shaped frame members of metal or plastic which are resistant to exposure to chemicals with which the frame members come into contact under operating conditions of the bipolar electrolytic cell. The frame components of the bipolar electrolytic cell can also be formed of U or channel shaped members suitably formed so as to accommodate insertion of a reinforcing core material within the opening in the frame members. The frame component, in one embodiment of the invention, comprises a multiplicity of rectangularly shaped frame members consisting of parallel top and bottom members of predetermined length interconnected by opposing, parallel vertically positioned first and second side members of predetermined length and divided by at least one member parallel to said top and bottom members so as to define at least two rectangularly shaped openings suitable for contacting the periphery of said electrode so as to form multiple electrochemical cell units extending in a vertical, upright position during operation of said cell. The core material can be formed of a mixture of an electrolyte resistant filler and an electrolyte resistant thermosetting resin such as a polyester, a polyether, a phenolic, or an epoxy resin. The core material also must be resistant to electrolysis products. Useful filler materials can be particulate or fibrous and are illustrated by such chemically inert materials as sand, talc, titanium dioxide, chopped glass fibers or a chopped fibrous polyolefin or halocarbon polymer such as polytetrafluoroethylene fibers. The proportion of filler utilized in admixture with the thermosetting resin for the formation of the core material can be about 50 to about 95% by weight, preferably about 60 to about 85% by weight and most preferably, about 70 to about 80% by weight.

The materials of construction for the frame component of the bipolar electrolyzer of the invention will be metals or hydrophobic polymers which are capable of withstanding exposure to chemicals with which they come into contact under the operating conditions of the electrolytic cell. Thus the frame components for use, for example, in a chlor-alkali electrolytic cell which are in contact with the anolyte, will be such as to be capable of withstanding the action of alkaline and/or acid brines in the presence of chlorine, while the frame components in contact with the catholyte will be such as to be capable of resisting the corrosive attack of caustic mixtures. Generally the frame components in contact with the anolyte will be made of a single metal or a metal composite such as titanium, nickel, titanium clad copper or steel or other such metal or suitable material and the portion of the frame in contact with the catholyte will often be of steel, nickel, stainless steel (high chromium or high nickel content) nickel clad steel, nickel clad copper, stainless steel on copper or stainless steel on steel.

When the frame is open on one side, i.e., U-shaped or channel shaped, the frame material, or liner, can also be made of various synthetic organic polymers. For example the frame liner can be made from a hydrophobic polymer, for example, a polyolefin or a thermoplastic halocarbon polymer. Polytetrafluoroethylene or polypropylene are the most preferred polymers for use in the Preparation of the frame liners but if desired other hydrophobic polymers can be used instead such as a polymer of fluorinated ethylene propylene, polyvinylidene chloride, polyvinyl dichloride, and polyvinyl difluoride. The use of thermoplastic polymers for the formation of the liner portion of the frame allows the use of extruded portions of the liner component of the frames which can be readily assembled into the rectangular shaped frame and thereafter filled with a mixture of a thermosetting polymer and a filler.

The thickness of the frame must be calculated for the specific design of the filter press electrolytic cell. In this respect, the gasket pressure required is perhaps more significant a design factor than hydraulic pressure. In general, the thickness of the frame liner material is in the range from about 0.05 to about 0.25 inches and preferably from about 0.08 to about 0.15 inches. Generally, the overall thickness of the frame, including the core material, is in the range of about 2 to about 10 centimeters, preferably about 2.5 to about 6 centimeters and most preferably about 3 to about 5 centimeters.

The openings required in the frame for inlets, outlets, and conductors tend to reduce the strength of the frame at the points of passage. Without the use of a metallic or plastic channel filled with core material as a component of the frame, electrode sections considerably thicker than the size of the frame specified above might be required simply to provide adequate frame strength. Frame liner formed into channels from sheet materials have advantages over solid constructions in that flanges of the liner material forming the channel of the frame are inherently thin and thus the strength of the liner material is not reduced appreciably by penetration of the channel for inlets, outlets, and conductors. In addition, the core material which can be formed in place in the channels formed by the liner materials of the frame provide increased strength. The net result can be the use of a thinner electrode and therefore a less expensive cell on a unit basis.

The relative dimensions of the various parts of the frame can be changed to accommodate different electrolytic processes. For instance, different shapes of the frame channels can be used and modifications can be made in the methods of sealing the frames utilizing gasketting material without losing the prime advantages of such a frame, namely a strong filter press type cell frame made of either an electrically conductive metal liner and a thermosetting polymer/filler core material or a cell frame made of an organic polymer liner material each with a thermosetting polymer/filler core material.

The following examples illustrate the various aspects of the invention but are not intended to limit its scope. Where not otherwise specified throughout this specification and claims, temperatures are given in degrees centigrade, and parts, percentages, and proportions are by weight.

EXAMPLE I

An electrolytic cell was constructed in accordance with the schematic diagram shown in FIG. 2 except that the cell was only one cell unit high and contained only a single cell unit. The cell diaphragm was composed of three layers of a porous material composite available under the trade designation CELGARD ® from the Celanese Corporation. Each layer of the cell diaphragm was composed of a 1 mil thick microporous polyolefin film laminated to a non-woven polypropylene fabric so as to provide a total laminated thickness of 5 mils. Thus, a total cell diaphragm thickness of 15 mils resulted by the use of three layers of the composite material. The anode utilized in the cell was an insoluble electrode prepared by coating a nickel-plated steel substrate with an electrocatalytic amount of cobalt and tungsten compounds. The cathode was of the packed bed type and was composed of a particulate substrate, namely graphite coated with a mixture of carbon black and polytetrafluoroethylene. The thickness of the packed bed cathode was about 1.5 inches The cell was used to electrolyze a solution of sodium hydroxide which was stabilized utilizing 0.6% by weight based upon the concentration of sodium hydroxide in the electrolyte.

In the cell of Example I which illustrates the invention, a nickel sheet current collector was placed upon the back side of the packed bed cathode, the back side of the cathode being that side which faces away from the cell diaphragm. An aqueous concentration of 38.5 grams per liter of sodium hydroxide was utilized as the electrolyte and the cell was connected to a source of electric current so as to provide a current density of 0.3 amps per square inch and a cell voltage of 1.78 volts. Hydrogen peroxide was produced at a concentration of 30.5 grams per liter in an aqueous solution having a sodium hydroxide concentration of 60.3 grams per liter. Hydrogen peroxide was produced at a current efficiency of 92.2%.

EXAMPLE II

In the cell of Example II (control, forming no part of this invention) a similar electrolytic cell as compared to that described in Example I was set up and run to evaluate the voltage, product concentration and current efficiency where the current collector, instead of being positioned on the backside of the cathode, was positioned on the front side, namely, facing the cell diaphragm. Under similar operating conditions, namely, an electrolyte feed concentration of 41.4 grams per liter of sodium hydroxide, and a current density of 0.3 amps per square inch, a cell voltage of 1.74 volts was obtained at a current efficiency of 94.6%. The product concentration obtained was 32.7 grams per liter of hydrogen peroxide in an aqueous solution containing 61 grams per liter of sodium hydroxide.

Comparison of the inventive Example I with the control Example II shows there is no voltage penalty in the cell where the position of the current collector is moved from the conventional position on the front side of the cathode to the backside of the cathode. A person skilled in the art would expect a voltage penalty to occur since at 0.4 amps per square inch and under a pressure of 2.07 pounds per square inch gauge a voltage drop is obtained through a packed bed cathode similar to that utilized in the electrolytic cells described in Examples I and II. Where the cathode measures 1 inch in thickness, the voltage drop was 0.566 volts per inch. Therefore, since the cathodes utilized in the electrolytic cells of Examples I and II measured 0.5 inches in thickness, a person skilled in the art would expect a voltage penalty of 0.283 volts, or one-half the voltage drop measured through a 1 inch thickness of a packed bed cathode similar to that utilized in the electrolytic cells of Examples I and II.

While this invention has been described with reference to certain specific embodiments, it will be recognized by those skilled in the art that many variations are possible without departing from the scope and spirit of the invention and it will be understood that it is intended to cover all changes and modifications of the invention shown herein for the purposes of illustration which do not constitute departures form the spirit and scope of the invention.

The embodiments of the invention in which an exclusive property or privilege is claimed are defined as follows:

1. An electrode assembly exhibiting improve electrolyte flow through a diaphragm thereof when used in an electrochemical cell, said assembly comprising:
    (A) a liquid permeable, multiple layered diaphragm;
    (B) a porous, self-draining electrode, and
    (C) a current distributor; said current distributor and said diaphragm each being in contact with an opposite face of said electrode wherein said assembly exhibits substantially no voltage penalty as compared to use of an electrode assembly having said diaphragm and said current distributor located on the electrolyte side of said electrode.

2. The electrode assembly of claim 1 wherein said current distributor is a metal sheet and said gas diffusion electrode is a cathode.

3. The electrode assembly of claim 2 wherein said cathode comprises a bed of sintered particles or an agglomeration of loose particles and said cathode has pores of sufficient size and number to allow both gas and liquid to flow therethrough.

4. The electrode assembly of claim 3 wherein said particles of said cathode comprise graphite particles.

5. The electrode assembly of claim 4 wherein said cathode is a gas depolarized cathode and said pores are of sufficient size so that the passageways formed thereby have a minimum diameter of about 30 to about 50 microns.

6. The electrode assembly of claim 5 wherein said cathode is depolarized with an oxygen containing gas and said metal sheet comprises nickel.

7. In a bipolar electrode filter press type electrochemical cell for reacting a liquid with a gas, said cell comprising a porous, self-draining electrode and a diaphragm; the improvement comprising improved electrolyte flow through said diaphragm by using an electrode assembly comprising:
    (A) a liquid permeable, multiple layered diaphragm contacting a face of said electrode and
    (B) a current distributor contacting an opposite face of said electrode, wherein said assembly exhibits substantially no voltage penalty as compared to use of an electrode assembly having said diaphragm and said current distributor located on the electrolyte side of said electrode.

8. The electrochemical cell of claim 7 wherein said cell is for the manufacture of an alkaline peroxide aqueous solution, said bipolar electrode comprises a gas depolarized electrode, said current distributor is integral with an electrode opposite in polarity to said current distributor, and said liquid permeable diaphragm comprises multiple layers of a liquid permeable material comprising (A) a microporous polyolefin film or (B) a composite comprising said microporous polyolefin film and a support fabric resistant to degradation upon exposure to an electrolyte or electrolysis products thereof.

9. The electrochemical cell of claim 8 wherein said porous, self-draining, gas depolarized electrode is a cathode comprising a bed of sintered particles or an agglomeration of loose particles and said liquid permeable diaphragm has a flow rate of about 0.01 to about 0.50 milliliters per minute per square inch of diaphragm over an electrolyte head of 0.5 foot to 2 feet.

10. The electrochemical cell of claim 9 wherein said cathode comprises graphite particles coated with carbon, said support fabric is laminated to said microporous film, and said support fabric is a woven or nonwoven fabric selected from the group consisting of asbestos, polyolefins, polyamides, polyesters, polytetrafluoroethylene and mixtures thereof.

11. The electrochemical cell of claim 10 wherein said cathode is characterized as having pores forming passageways therein having a minimum diameter of about 30 to about 50 microns and wherein said support fabric consists of a polyolefin selected from the group consisting of polyethylene, polypropylene, polytetrafluoroethylene, fluorinated ethylene propylene, polychlorotrifluoroethylene, polyvinyl fluoride, polyvinylidene fluoride, and mixtures thereof.

12. The electrochemical cell of claim 11 wherein said liquid comprises an alkali metal hydroxide, said current distributor is a metal sheet and said liquid permeable diaphragm comprises a microporous polyolefin film characterized as hydrophilic and having a porosity of about 38% to about 45%, an effective pore size of about 0.02 to about 0.04 micrometers, and a thickness of about 1 mil.

13. The electrochemical cell of claim 12 wherein said liquid comprises sodium hydroxide, said metal sheet comprises stainless steel or a composite of a coated electrically conductive substrate selected from the group consisting of nickel and a nickel coated substrate, wherein said nickel or nickel coated substrate is coated with an electrocatalytically effective amount of cobalt and tungsten compounds, said cathode is depolarized with an oxygen containing gas, and said liquid permeable diaphragm comprises 2 to about 5 layers of said microporous polyolefin film.

14. A process for the manufacture of an alkaline peroxide aqueous solution by the electrolysis of an aqueous electrolyte in a bipolar, filter press type, electrolytic cell; said cell comprising a bipolar anode/current distributor; a liquid permeable diaphragm; a porous, self-draining cathode and an electrically nonconductive spacing means; wherein said cathode is in contact with a current distributor on one face of said cathode and is in contact with said liquid permeable diaphragm on an opposite face of said cathode; wherein said liquid permeable diaphragm comprises multiple layers of (A) a microporous polyolefin film or (B) a composite comprising said microporous polyolefin film and a support fabric resistant to deterioration upon exposure to electrolyte and electrolysis products thereof; wherein said anode/current distributor comprises stainless steel or a composite of a coated electrically conductive substrate, said substrate selected from the group consisting of nickel and a nickel coated substrate, wherein said nickel or nickel coated substrate is coated with an electrocatalytically effective amount of cobalt and tungsten compounds; and wherein said nonconductive spacing means separates said liquid permeable diaphragm and said anode, said process comprising:

(A) flowing a gas into a portion of said self-draining cathode;

(B) controllably flowing a liquid electrolyte through said liquid permeable diaphragm into a portion of said self-draining cathode at a rate about equal to the drainage rate of the cathode;

(C) electrolytically reacting said liquid electrolyte with said gas to form at least one non-volatile product; and (D) removing the products of electrolysis from said self-draining cathode.

15. The process of claim 14 wherein said liquid electrolyte is an aqueous solution comprising an alkali metal hydroxide, said process additionally comprising controlling the rate of flow of said liquid electrolyte by using a diaphragm comprising 2 to about 5 layers of said microporous polyolefin film.

16. The process of claim 15 wherein the rate of flow of said liquid electrolyte is controlled by adjusting the head of electrolyte in said anolyte compartment.

17. The process of claim 16 wherein said liquid electrolyte comprises sodium hydroxide and said gas in an oxygen containing gas.

18. The process of claim 17 wherein said oxygen containing gas is air.

19. A bipolar, filter press type electrochemical cell comprising a porous, self-draining electrode; a liquid permeable diaphragm, one face of said electrode being in a generally vertical, upright position during operation of said cell; and a frame comprising a rectangularly shaped frame member consisting of parallel top and bottom members of predetermined length interconnected by opposing, parallel, generally vertically positioned first and second side members of predetermined length and divided by at lest one member parallel to said top and bottom members so as to define multiple rectangularly shaped openings suitable for contacting the periphery of said electrode so as to form multiple electrochemical cell units extending in a generally vertical, upright position during operation of said cell.

20. The cell of claim 19 wherein said frame member consists of a metal or metal composite selected from the group consisting of titanium, nickel, titanium clad copper or steel, steel, nickel clad steel, nickel clad copper or steel, stainless steel on copper, and stainless steel on steel.

21. The electrochemical cell of claim 19 comprising said porous, self-draining electrode in contact with said liquid permeable diaphragm on one face of said electrode and in contact with a current distributor on an opposite face of said electrode, said cell having multiple cell units extending both in a generally horizontal direction and in a generally vertical direction.

22. The bipolar electrolytic cell of claim 21 wherein said porous, self-draining electrode is a cathode and comprises a packed bed of electroconductive, sintered particles or a packed bed of an agglomeration of electroconductive loose particles, each having pores of sufficient size and number to allow both gas and liquid to flow therethrough and wherein said particles comprise graphite particles coated with carbon.

* * * * *